Jan. 28, 1964   H. W. WEPRIN   3,119,145
ANIMAL CARCASS UNHAIRING METHOD
Filed Jan. 18, 1961   3 Sheets-Sheet 1
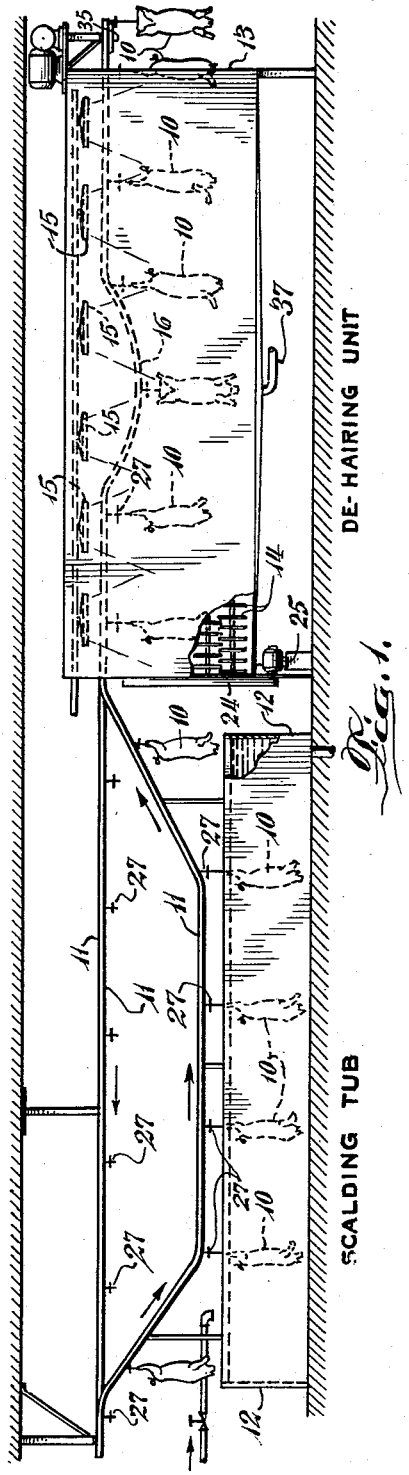
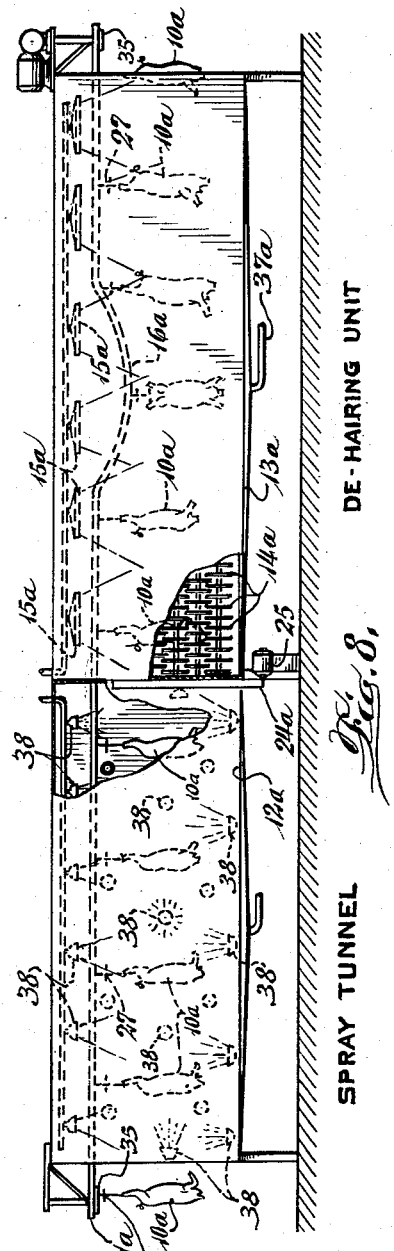
INVENTOR.
Harry W. Weprin
BY Carl C. Batz
Attorney

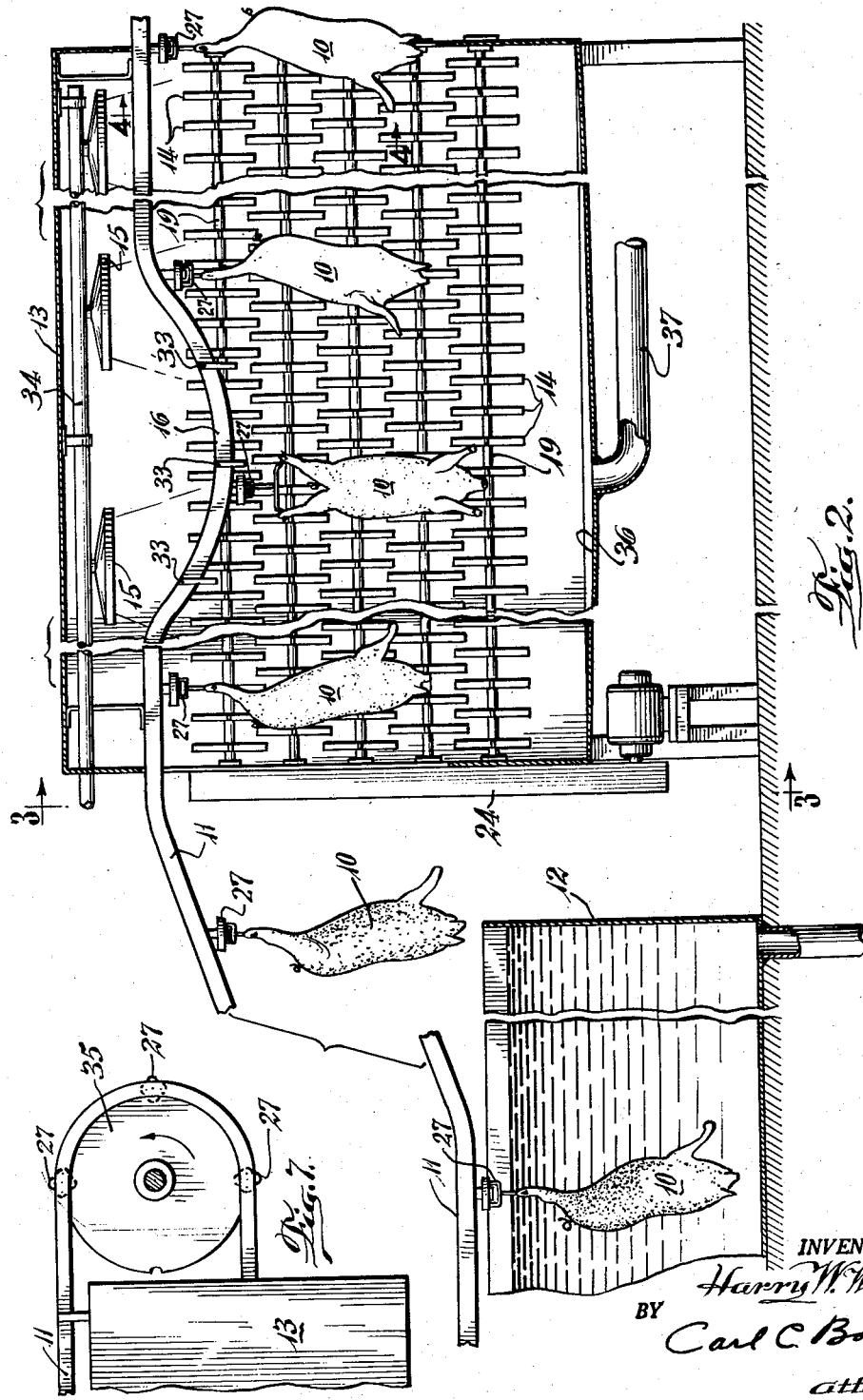

Jan. 28, 1964 H. W. WEPRIN 3,119,145
ANIMAL CARCASS UNHAIRING METHOD
Filed Jan. 18, 1961 3 Sheets-Sheet 3
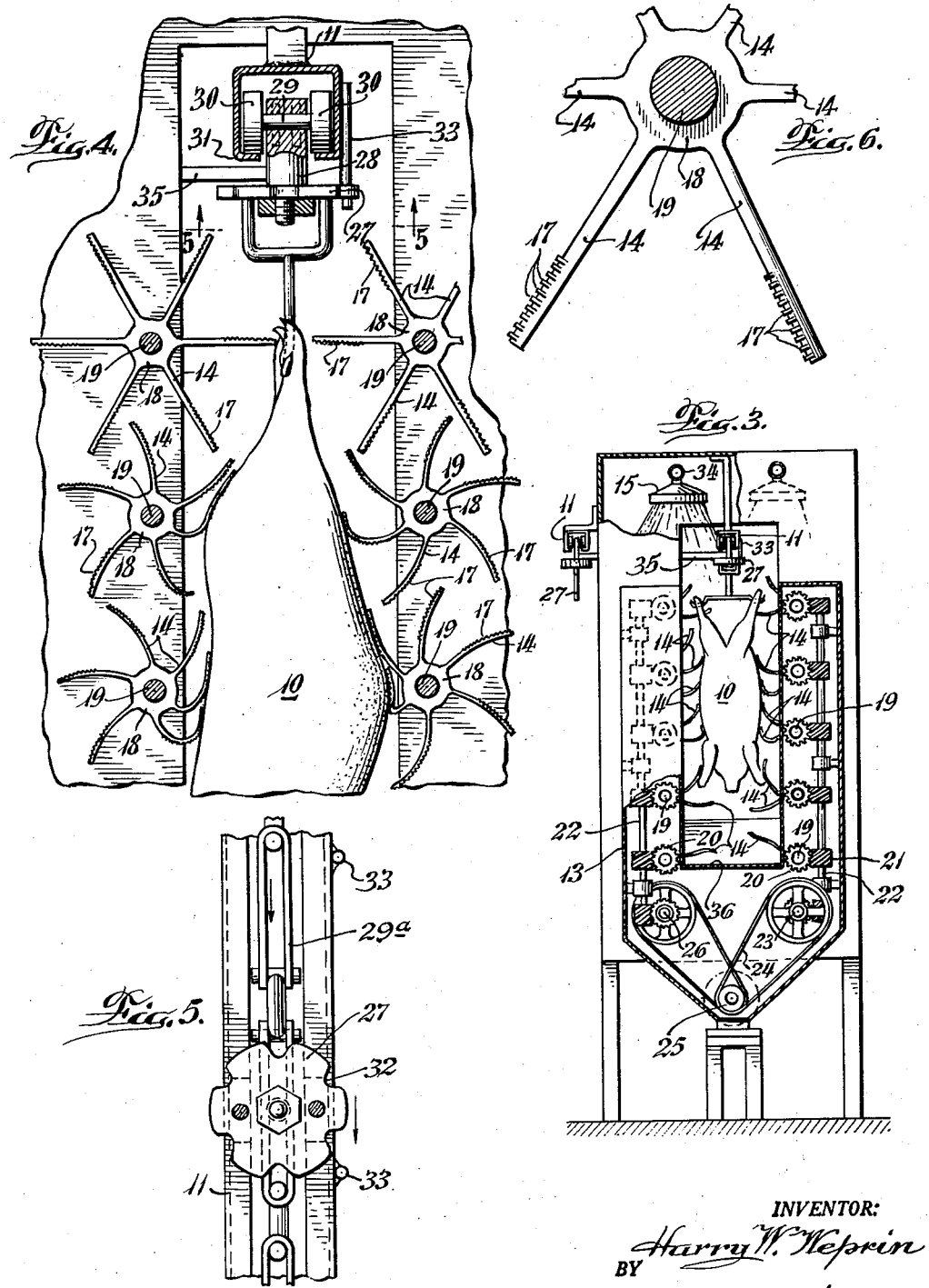
INVENTOR:
Harry W. Weprin
BY
Carl C. Batz
Attorney

3,119,145
ANIMAL CARCASS UNHAIRING METHOD
Harry W. Weprin, Chicago, Ill., assignor to Armour and Company, Chicago, Ill., a corporation of Delaware
Filed Jan. 18, 1961, Ser. No. 83,569
4 Claims. (Cl. 17—45)

This invention relates to unhairing methods and apparatus, and is particularly useful in the unhairing of hog carcasses and other animal carcasses and skins. For the purpose of simplicity, the invention will be described herein in connection with the unhairing of hog carcasses.

In the conventional unhairing of hog carcasses, the carcasses are moved forward through a long vat containing water at 136–142° F. The carcasses are then carried from the vat to a mechanical dehairing machine where they are subjected to the beating action of stiff rubber paddles with steel cleats on their ends. Following the beating operation, the carcasses may be dipped in molten pine tar resin which, after hardening, is peeled from the carcasses, removing some embedded hair and bristles. The foregoing operations, while removing as much as 97% or 98% of the hair, must be followed by further expensive unhairing steps. Usually the carcasses are singed, using an air gas blast burner to burn off residual hair, and this operation may be followed by a further beating with rubber paddles having steel cleats under a spray of warm water to remove the stubble of charred hair tips. Finally, the carcasses are hand shaved to remove any remaining hair and trimmed of bruised or torn skin.

The foregoing processes are costly and difficult to control. The size of the carcass is subject to extreme variation, and in addition different breeds of hogs have different characteristics with respect to scalding. Further, there is a seasonal aspect in that in late fall there is a "hard hair" season in which new hair is starting to grow, the new hair being more difficult to remove.

Added to the above difficulties is the fact that over-scalding leads to cooked skin areas and white blotches on the carcass, these areas being very tender and susceptible to damage by the beaters. Any damaged area must be trimmed out, with subsequent loss of product and higher labor costs. Under-scalding or heating results in excessive amounts of hair and epidermic tissue and "scurf" remaining on the carcass, which must be removed by singeing and shaving. Even the latter operations do not remove the hair roots, which, in the case of hogs, extend through the skin into the subcutaneous fat, and this reduces the value of the carcass.

I have discovered that through the maintenance of certain critical conditions, it is possible to traverse the entire surface of the carcass and to remove all of the hair in one operation, thus eliminating the expensive shaving and trimming operations, etc. There is a critical scalding temperature at which the hair and epidermis are loosened. However, when the scalding temperature is continued, as when the carcass is held for a substantial period in the scalding tub, the epidermis (scurf) is broken into small fragments in the beaters and some individual hair is left embedded in the follicle. This requires the hand-shaving and other expensive steps. However, when the temperature of the carcass skin is raised gradually so as to reach the desired scalding temperature at the time beating begins, the hair adheres to the epidermis and when the tissue is loosened, the hair and epidermis tend to be removed in a continuous sheet. In this manner, substantially all of the hair is removed and no further dehairing operations are required. The process may follow the conventional unhairing operation to remove the final hairs on the carcass, or it may be employed alone for the complete unhairing of the carcass.

A primary object, therefore, of the invention is to provide a process and means whereby substantially all of the hair of a carcass can be removed in a beater operation. A further object is to provide a method and means for the unhairing of carcasses in a beater operation while maintaining critical temperature and treatment conditions permitting ready removal of the hair. Yet another object is to provide a method whereby the entire area of the carcass is traversed under conditions which permit the removal of hair in a single operation. A still further object is to provide apparatus wherein rubber or other resilient fingers are caused to traverse the entire area of the carcass for the removal of substantially all of the hairs. Another object is to provide a process and apparatus whereby carcasses may be gradually brought to a critical skin temperature and maintained at such temperature during a beater operation which brings about substantially complete dehairing. Other specific objects and advantages will appear as the specification proceeds.

The invention is shown, in illustrative embodiments, by the accompanying drawings, in which—

FIG. 1 is a broken side view in elevation of apparatus which may be employed in the practice of my process and which embodies my invention; FIG. 2, an enlarged broken longitudinal sectional view of a portion of the apparatus shown in FIG. 1; FIG. 3, a vertical sectional view, the section being taken as indicated at line 3—3 of FIG. 2; FIG. 4, a broken detail sectional view on an enlarged scale, the section being taken as indicated at line 4—4 of FIG. 2; FIG. 5, a detail sectional view, the section being taken as indicated at line 5—5 of FIG. 4; FIG. 6, a broken detail sectional view showing one form of beater apparatus which may be used; FIG. 7, a broken top plan view of a portion of the conveyor apparatus employed for carrying the hog carcasses; and FIG. 8, a broken side view in elevation similar to FIG. 1 but showing a modified form of the apparatus and process.

In the illustration given in FIG. 1, hog carcasses 10 are carried upon a conveyor rail 11 through a scalding vat 12 filled with hot water and thence into a beater tunnel 13 where the carcasses are struck by rubber beaters 14 and where hot water is delivered through spray heads 15. Within the tunnel 13 the carcasses 10 are moved vertically relative to the beaters by being conveyed along a downwardly-curved track portion 16. After leaving the tunnel 13, the carcasses are returned outside of the tunnel along a horizontal portion of the track 11.

The beaters 14 may be formed of rubber, either natural or synthetic, or of any other suitable resilient material, and may be tubular or solid in cross section. If desired, the fingers 14 may be provided with ribs 17 near their ends, as indicated in FIG. 6. In the illustration given in FIG. 6, the hub 18 is carried by rotating shaft 19 and the fingers 14 are integral with the hub.

As shown more clearly in FIG. 3, the shafts 19, which bear the hub 18 and the fingers 14, may be driven through mechanism of the character shown, each shaft 19 being provided at one end with a gear 20 meshing with a worm gear 21 carried by a drive shaft 22. The shaft 22 is driven through a worm connection carried by another shaft 23 driven by pulley 24 connected with a motor-driven pulley 25. In the specific illustration given, the motor-driven pulley 25 drives, through its belts 24, the shafts 26 and 23 and thereby the two shafts 22, each of the shafts being provided with worms 21 engaging gears 20 carried by the shafts 19 on each side of the carcass 10. It will be understood that any suitable form of apparatus for rotating the shafts 19 and the beater fingers may be employed. As illustrated more clearly in FIG. 4, the length of the beater fingers may vary so that there is complete coverage of the carcass by beater contact.

Any suitable means for suspending the carcass and for rotating the carcass during its progress through the tunnel 13 may be provided. As shown more clearly in FIG. 4, a Geneva type disc 27 is suspended upon a shaft 28 which in turn is carried by a cross shaft 29 of a chain 29a having rollers 30 which travel on track 31 provided by conveyor rail 11. The disc 27 is free to rotate, and its notches 32, as shown more clearly in FIG. 5, progressively engage pins 33 as the carcass is moved through the tunnel. The spaced pins 33 thus produce a continuous turning of the hog carcass as it moves through the beaters, and the downwardly-curved track portion 16 causes vertical movement of the carcass as it moves through the tunnel. Thus the beaters, in their spaced arrangement through the progressive rotation of the carcass and its vertical movement with respect to the beaters, completely traverse the carcass to remove the hairs.

Above the carcass track in the tunnel are mounted spray heads 15, and these are used for maintaining the critical temperature conditions which will be hereinafter described. The hot liquid is supplied to the heads 15 by the pipe 34. The spray water is directed to a container 36 and may be removed through the drain pipe 37, as shown more clearly in FIG. 2.

As shown in FIG. 7, after passing through the tunnel, the de-haired carcass is carried about the motor-driven wheel 35 and then by the horizontal section of track 11 to any other desired destination. In the modification illustrated in FIG. 8, the carcasses 10a are conveyed on a conveyor 11a through a scalding chamber 12a in which hot water is sprayed upon the carcasses from all angles, the spray heads being indicated by the numerals 38. By the use of such spray nozzles, the carcasses are brought to the desired critical temperature and then proceed through a beater tunnel 13a which is substantially the same in construction and operation as the tunnel 13 heretofore described. In this modification, the carcasses, instead of being immersed in hot water, as illustrated in FIG. 2, are heated by spray water to the desired temperature and the carcasses, after attaining the desired skin temperature, immediately pass into contact with the beaters 14a.

I have discovered that through the use of rubber beaters brought into contact with the entire area of the carcasses at a moment when the skin has reached a critical temperature, it is possible to remove all of the hairs, the hair and epidermis (scurf) being removed in a continuous sheet. Apparently, the greatest ease of hair and skin removal exists at the stage of denaturation of the collagen about the hair shaft, which occurs fairly soon after the skin reaches the scalding temperature of 135–140° F., and usually about 138° F. When scalding is continued after this critical point, the scurf is broken into small fragments and individual hairs are left embedded in the follicle. This requires the hand shaving heretofore referred to. However, if the skin temperature is gradually raised until the above critical scalding temperature is reached at the moment of beating, there is no fragmentation of the scurf, but, instead, the scurf and hair comes off in a continuous sheet under the friction action of the rubber beaters. In my process, therefore, I prefer to scald and de-hair simultaneously so that the hair and scurf are removed as soon as loosening occurs. In other words, the skin of the carcass is raised gradually in temperature, keeping it below scalding temperature until the carcass reaches the beater tunnel, where the desired scalding temperature is reached for the first time and such scalding temperature is maintained by the spray from heads 15 until the beating operation is completed. While the scalding temperature may vary between 135° and 140° F., I find that for most dehairing operations the critical temperature will be around 138° F., and when this temperature is reached and maintained as the rubber beaters start to work, continuous sheet removal of the epidermis and hair is brought about.

While I have provided in the illustrated embodiment the spray heads 38 and 15 for delivering a spray of liquid over the surface of the carcasses it is understood other ways may be utilized for passing over the surface of the carcasses a heat exchange fluid for heating and maintaining the desired temperatures. For example, the nozzles may be designed to deliver a sheet of liquid through which the carcasses must pass, or warm gases may be blown across the surfaces of the carcasses to maintain the necessary temperature.

*Operation*

In the operation of the apparatus as shown in FIGS. 1–7, inclusive, the carcasses 10 are drawn through the hot water in vat 12 to raise the temperature of the carcass skin almost to 138° F. As the carcass enters the tunnel 13, hot spray water from heads 15 bring the skin to the desired scalding temperature and the beaters remove the continuous sheet of epidermis and hair. The water and the removed epidermis and other foreign material are carried away through the drain pipe 37, and the dehaired carcass is transported away from the apparatus by the horizontal leg of conveyor 11. In the passage of the carcass through the tunnel 13, the carcass is progressively turned by the engagement of the depending pins 33 with the notches 32 of disc 27. Also, the carcass 10 is lowered and raised along the curved portion 16 of track 11. The fingers 14, which may vary in length, the rotary movement of the carcass, and the raising and lowering of the carcass relative to the beaters, bring about complete coverage of the carcass by the beaters so that substantially all of the hairs are removed during the transit through the tunnel 13.

In the operation shown in FIG. 8, the control of the skin temperature is rendered more effective through the use of spray heads 38 so that as the carcass reaches the tunnel 13a, the skin temperature is just at the critical point where denaturation of the collagen is beginning so that the beaters become effective in removing the epidermis and hair in a continuous sheet. The desired temperature is maintained through the tunnel 13a by the spray from the successive spray heads 15a.

While, in the operations described, a complete dehairing is accomplished in a single operation, it will be understood that the carcass may be unhaired by conventional methods and the final hair removed by the operation in tunnels 13 or 13a. I prefer, however, to accomplish all of the unhairing by the simple steps described and shown in FIGS. 1 and 8.

While I prefer to rotate the carcass progressively as it moves through the tunnels 13 and 13a, the carcass may be freely supported upon the swivel of disc 27, it being found that the beaters themselves tend to move the carcass in its passage through the tunnel. Further, while I have shown the track curved downwardly at 16 for the purpose of raising and lowering the carcass relative to the beaters, it will be understood that the beaters themselves may be caused to move upwardly and downwardly while the carcass is transported along a uniform horizontal track.

It will be understood that the rubber fingers may be rotated in the same directions or alternate rows of fingers may be rotated in opposite directions. Further, if desired, the prior scalding steps may be omitted and the carcass may be passed directly through the tunnel with hot water being sprayed on the carcass to bring about the proper temperature for the unhairing operation.

While the invention has been described in connection with the removal of hair from carcasses, it will be understood that the process and apparatus may be used for washing skins and hides of calves, cattle, and other animals.

While, in the foregoing specification, I have set forth specific structure and process steps in considerable detail for the purpose of illustrating the invention, it will be understood that such details may be varied widely by those skilled in the art without departing from the spirit of my invention.

I claim:

1. In a process for unhairing a hog carcass, the steps of raising the temperature of the skin gradually until the temperature reaches the point at which denaturation of the collagen about the hair begins, thereupon beating the skin of substantially the entire carcass with rubber fingers to remove the hair-bearing portions of the skin in sheets while passing a heat exchange fluid across the skin to maintain the temperature thereof during the beating operation.

2. In a process for unhairing an animal carcass, the steps of raising the temperature of the skin gradually to the point within the range of 135° to 140° F. at which denaturation of the collagen begins, and immediately bringing rubber fingers into frictional contact with the skin of the carcass with a beating action to draw off portions of the skin in sheets while the hair adheres to the skin and during such beating operation passing a heat exchange fluid over the skin to maintain the temperature thereof during the beating operation.

3. The process of claim 2 in which the temperature is maintained at about 138° F.

4. In a process for unhairing a hog carcass, the steps of raising the temperature of the skin of the carcass to about 138° F. at which denaturation of the collagen about the hair begins and while the hair still adheres to the skin, and immediately removing the skin of the carcass in sheets by bringing rubber fingers repeatedly into frictional contact with the skin of the carcass and while maintaining the temperature of the skin at about 138° F.

References Cited in the file of this patent

UNITED STATES PATENTS

| | | |
|---|---|---|
| 1,383,347 | Stallman | July 5, 1921 |
| 1,834,479 | Taylor | Dec. 1, 1931 |
| 2,020,846 | McKee et al. | Nov. 12, 1935 |
| 2,084,856 | McKee et al. | June 22, 1937 |
| 2,084,857 | McKee et al. | June 22, 1937 |
| 2,783,496 | Thomas | Mar. 5, 1957 |